(12) United States Patent
Kao et al.

(10) Patent No.: US 10,295,779 B2
(45) Date of Patent: May 21, 2019

(54) MULTIPLE LENSES DRIVING MECHANISM

(71) Applicant: TDK TAIWAN CORP., Yangmei Taoyuan (TW)

(72) Inventors: Kuo-Chun Kao, Yangmei Taoyuan (TW); Nai-Wen Hsu, Yangmei Taoyuan (TW); Shih-Ting Huang, Yangmei Taoyuan (TW); Shao-Chung Chang, Yangmei Taoyuan (TW); Fu-Yuan Wu, Yangmei Taoyuan (TW); Sin-Jhong Song, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 0 days.

(21) Appl. No.: 15/725,649

(22) Filed: Oct. 5, 2017

(65) Prior Publication Data

US 2018/0100983 A1    Apr. 12, 2018

Related U.S. Application Data

(60) Provisional application No. 62/405,450, filed on Oct. 7, 2016.

(30) Foreign Application Priority Data

Sep. 30, 2017   (CN) .......................... 2017 1 0918438

(51) Int. Cl.
| | |
|---|---|
| *G02B 7/02* | (2006.01) |
| *G02B 7/09* | (2006.01) |
| *G02B 7/08* | (2006.01) |
| *G03B 3/10* | (2006.01) |
| *G03B 5/00* | (2006.01) |
| *G02B 13/00* | (2006.01) |

(52) U.S. Cl.
CPC ............... *G02B 7/021* (2013.01); *G02B 7/08* (2013.01); *G02B 7/09* (2013.01); *G03B 3/10* (2013.01); *G03B 5/00* (2013.01); *G02B 13/001* (2013.01); *G03B 2205/0007* (2013.01); *G03B 2205/0053* (2013.01); *G03B 2205/0069* (2013.01)

(58) Field of Classification Search
CPC ...................................................... G02B 7/021
USPC ......................................................... 359/823
See application file for complete search history.

(56) References Cited

U.S. PATENT DOCUMENTS

2008/0225129 A1*   9/2008   Viinikanoja ......... H04N 13/239
348/218.1

* cited by examiner

*Primary Examiner* — James C Jones
(74) *Attorney, Agent, or Firm* — Muncy, Geissler, Olds & Lowe, P.C.

(57) ABSTRACT

A multiple lenses driving mechanism is provided, including a frame, a first lens holder, a second lens holder, a first lens driving assembly, a second lens driving assembly and a stopper. The first and second lens holders are disposed in the frame, arranged along a longitudinal axis for respectively holding a first lens and a second lens. The first lens and the second lens define a first optical axis and a second optical axis, respectively. The first and second lens driving assemblies are disposed in the frame to drive the first lens holder and the second lens holder, respectively. The stopper is disposed between the first and second lens holders and has a first restricting surface and a second restricting surface, facing the first and second lens holders, so as to restrict the first and second lens holders in a first restricted position and a second restricted position.

20 Claims, 13 Drawing Sheets

MULTIPLE LENSES DRIVING MECHANISM

CROSS-REFERENCE TO RELATED APPLICATIONS

This application claims the benefit of US provision Application No. 62/405,450 filed on Oct. 7, 2016, and China Patent Application No. 201710918438.1, filed Sep. 30, 2017, the entirety of which are incorporated by reference herein.

BACKGROUND OF THE INVENTION

Field of the Invention

The invention relates to a multiple lenses driving mechanism, and more particularly to a multiple lenses driving mechanism with a stopper disposed between lens holders.

Description of the Related Art

Current mobile devices (e.g. mobile phones) normally include a digital-image capturing function, which is made possible through the miniaturization of lens driving mechanisms. The widely used voice coil motors (VCM) are usually disposed in the multiple lenses driving mechanism, providing an image stability function by using a combination of coils, magnets, and springs to hold the lenses and to drive the lenses in the direction of the optical axis.

Conventional multiple lenses driving mechanisms usually need blocking walls to be disposed between the lens holders to prevent different lens holders from coming into contact with each other. However, the space taken up by the blocking walls is normally not beneficial for the miniaturization of the mechanism. As a result, how to solve the above problems and design a smaller multiple lenses driving mechanism is an important issue.

BRIEF SUMMARY OF THE INVENTION

The present invention discloses a multiple lenses driving mechanism, comprising a frame, a first lens holder, a second lens holder, a first lens driving assembly, a second lens driving assembly, and a stopper. The first lens holder and the second lens holder are disposed in the frame and are arranged along a longitudinal axis to respectively hold a first lens and a second lens. The first lens and the second lens respectively define the first optical axis and the second optical axis. The first lens driving assembly and the second lens driving assembly are disposed in the frame and respectively drive the first lens holder and the second lens holder. The stopper is disposed between the first and second lens holders and has a first restricting surface and a second restricting surface. The first restricting surface and the second restricting surface face the first lens holder and the second lens holder, respectively, so as to hold the first and second lens holders in a first restricted position and a second restricted position.

In some embodiments, the first restricting surface and the second restricting surface are parallel to each other.

In some embodiments, the material of the stopper includes metal.

In some embodiments, the material of the stopper includes nonmagnetic materials.

In some embodiments, the first restricting surface and the second restricting surface are not parallel to each other.

In some embodiments, the stopper is disposed at a side of the frame.

In some embodiments, the first lens holder comprises a restrict portion, and the restrict portion comprises a stopping face that faces the stopper.

In some embodiments, the multiple lenses driving mechanism further comprises a base, wherein the stopper and the base are integrally formed at one piece.

In some embodiments, the multiple lenses driving mechanism further comprises a damping element disposed between the stopper and the first lens holder.

In some embodiments, the multiple lenses driving mechanism further comprises a damping element disposed between the first lens holder and the second lens holder.

In some embodiments, the multiple lenses driving mechanism further comprises a position sensing element disposed on the stopper.

In some embodiments, the first restricting surface and the second restricting surface along the longitudinal axis are between the first optical axis and the second optical axis.

In some embodiments, the multiple lenses driving mechanism further comprises a plurality of stoppers, disposed between the first lens holder and the second lens holder.

In some embodiments, the stopper and the frame are integrally formed at one piece.

In some embodiments, the first lens holder has a C-shaped structure.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The making and using of the embodiments of a dual-lens camera system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
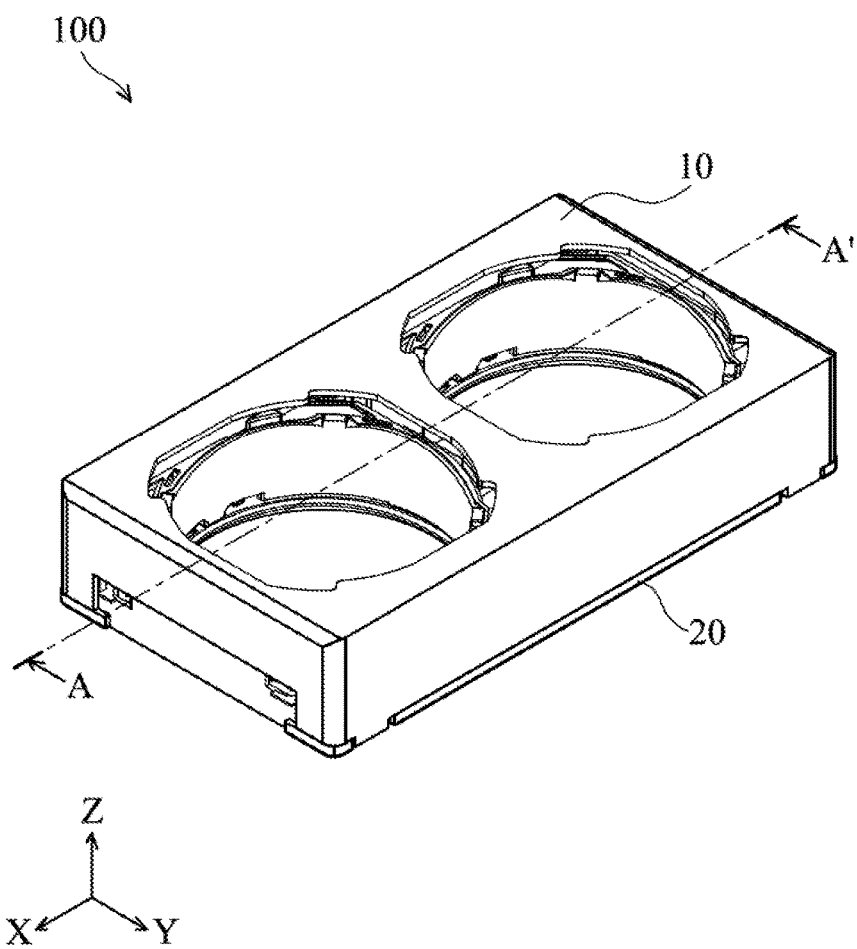
FIG. 1 is a schematic view of a multiple lenses driving mechanism in accordance with an embodiment of the invention.
Figure 2:
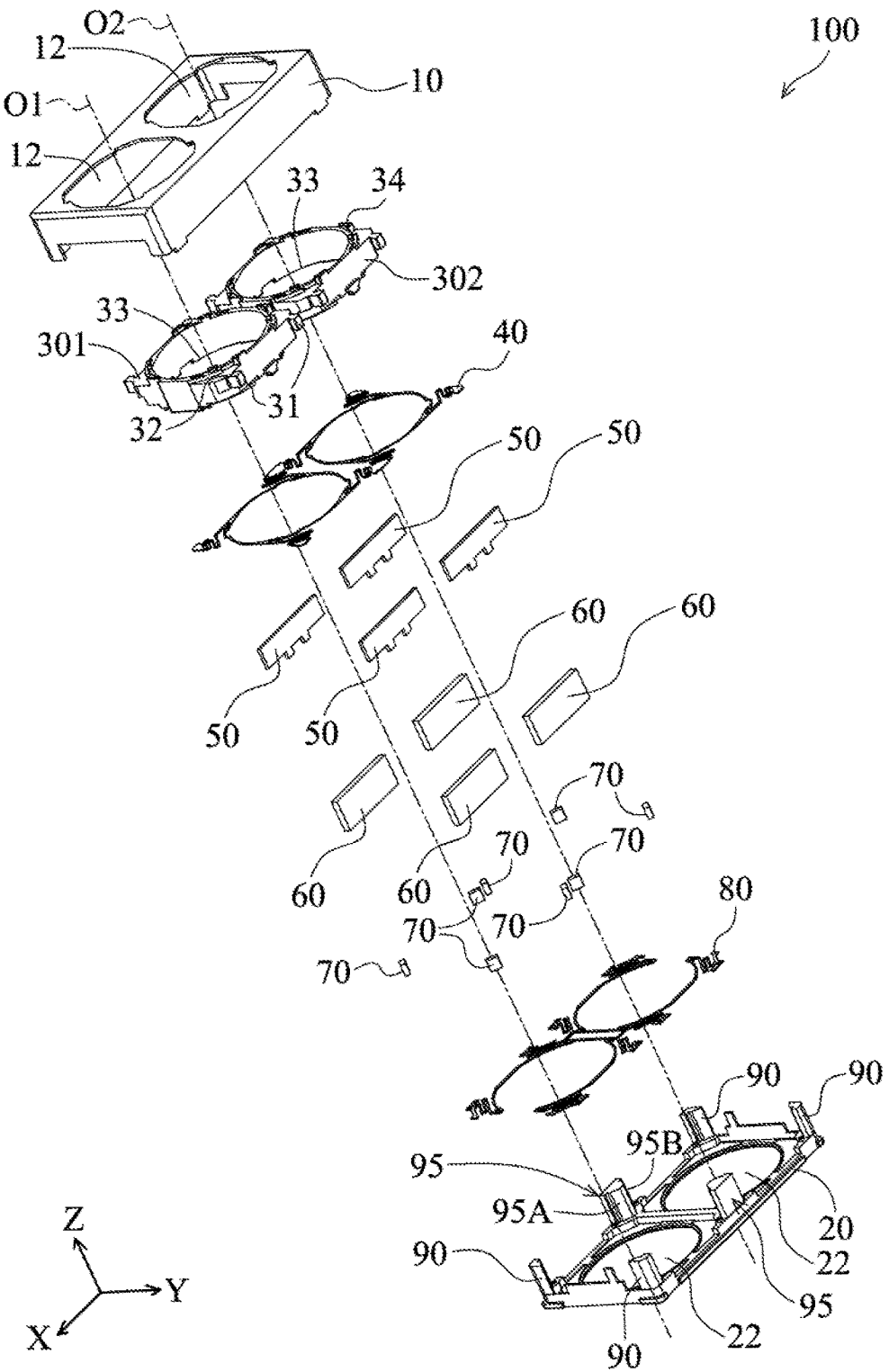
FIG. 2 is an exploded view of the multiple lenses driving mechanism in FIG. 1.
Figure 3:
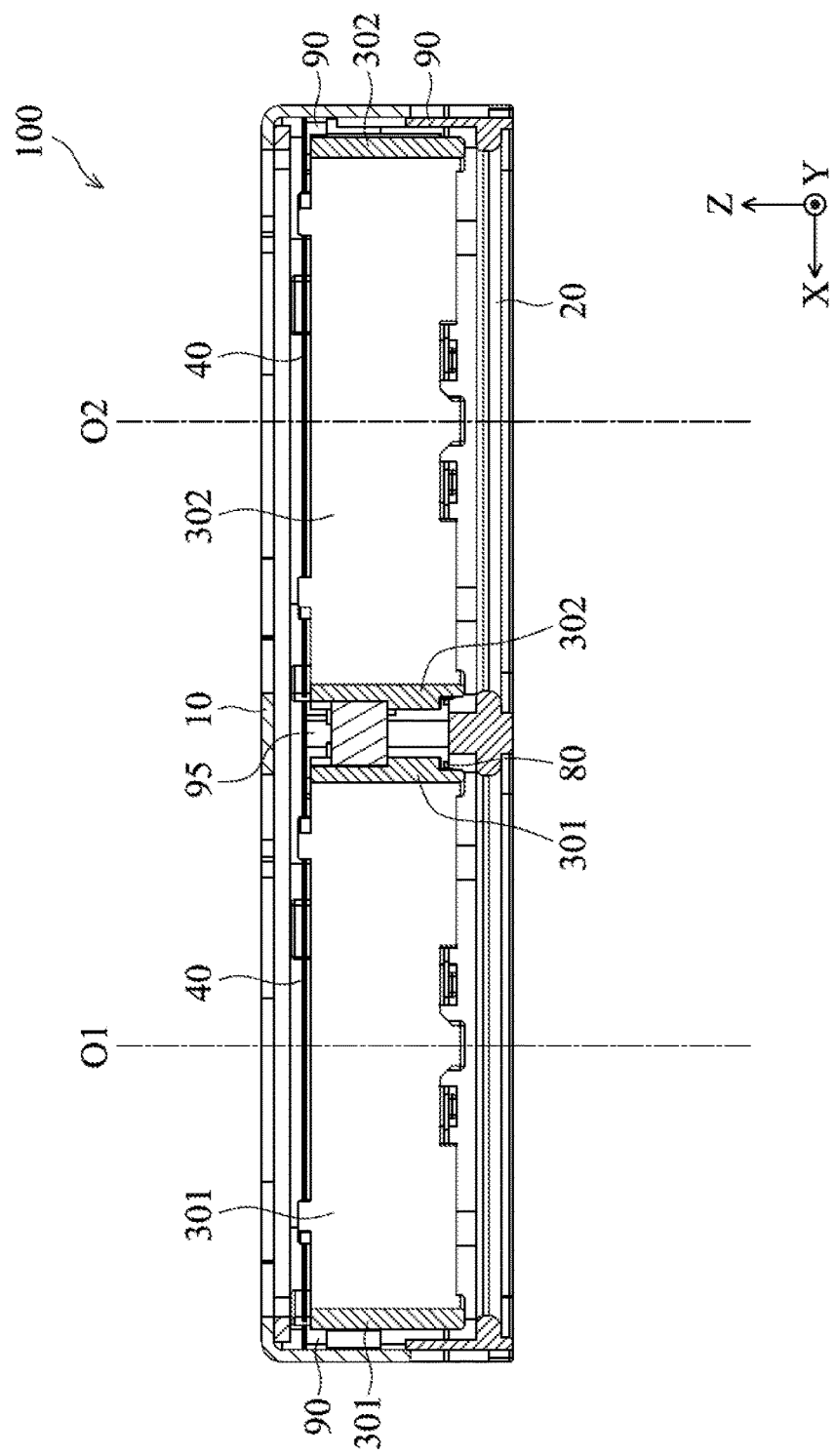
FIG. 3 is a cross-sectional view which takes along the line A-A' in FIG. 1.

Referring to FIGS. 1 to 3, FIG. 1 is a schematic view of a multiple lenses driving mechanism 100 in accordance with an embodiment of the invention, FIG. 2 is an exploded view of the multiple lenses driving mechanism 100 in FIG. 1, and FIG. 3 is a cross-sectional view take along the line A-A' in FIG. 1. The multiple lenses driving mechanism 100 may be used for holding two optical elements (not shown), such as a voice coil motor (VCM) equipped with an optical image stabilizer (OIS) function.

As shown in FIGS. 1 to 3, the multiple lenses driving mechanism 100 in this embodiment mainly includes a top casing 10, a base 20, a first lens holder 301, a second lens holder 302, an upper spring 40, a plurality of coils 50 (such as flat printed coils), a plurality of driving magnets 60, a plurality of damping elements 70, a lower spring 80, a plurality of convex columns 90, and at least one stopper 95.

The top casing 10 can be combined with the base 20 to form a frame of the multiple lenses driving mechanism 100. In addition, two top casing openings 12 and two base openings 22 are respectively formed on the top casing 10 and the base 20. The center of the two top casing openings 12 are respectively located on a first optical axis O1 and a second optical axis O2 of a first lens and a second lens (not shown). The two base openings 22 correspond to an image sensor (not shown) placed outside the lens driving mechanism 100. Accordingly, the first lens and the second lens in the multiple lenses driving mechanism 100 and the image sensor can respectively perform image focusing in the direction of the first optical axis O1 and the second optical axis O2.

In this embodiment, the first and second lenses holders 301, 302 and the lenses therein are movably disposed in the top casing 10 and the base 20. More specifically, the first lens holder 301 and the second lens holder 302 are suspended in the top casing 10 and the base 20 by the upper spring 40 and the lower spring 80 made of a metal material (FIG. 3). When a current is supplied to the coils 50, the coils 50 can act with the magnetic field of the driving magnets 60 to generate an electromagnetic force to respectively move the first lens holder 301 and the second lens holder 302 and the lenses therein along the first optical axis O1 and the second optical axis O2 direction with respect to the frame 50 to achieve auto focusing. In this embodiment, the coils 50 are secured on the outer surface of the first lens holder 301 and the second lens holder 302, and the driving magnets 60 are secured on the base 20 and correspond to the coils 50.

Figure 4A:
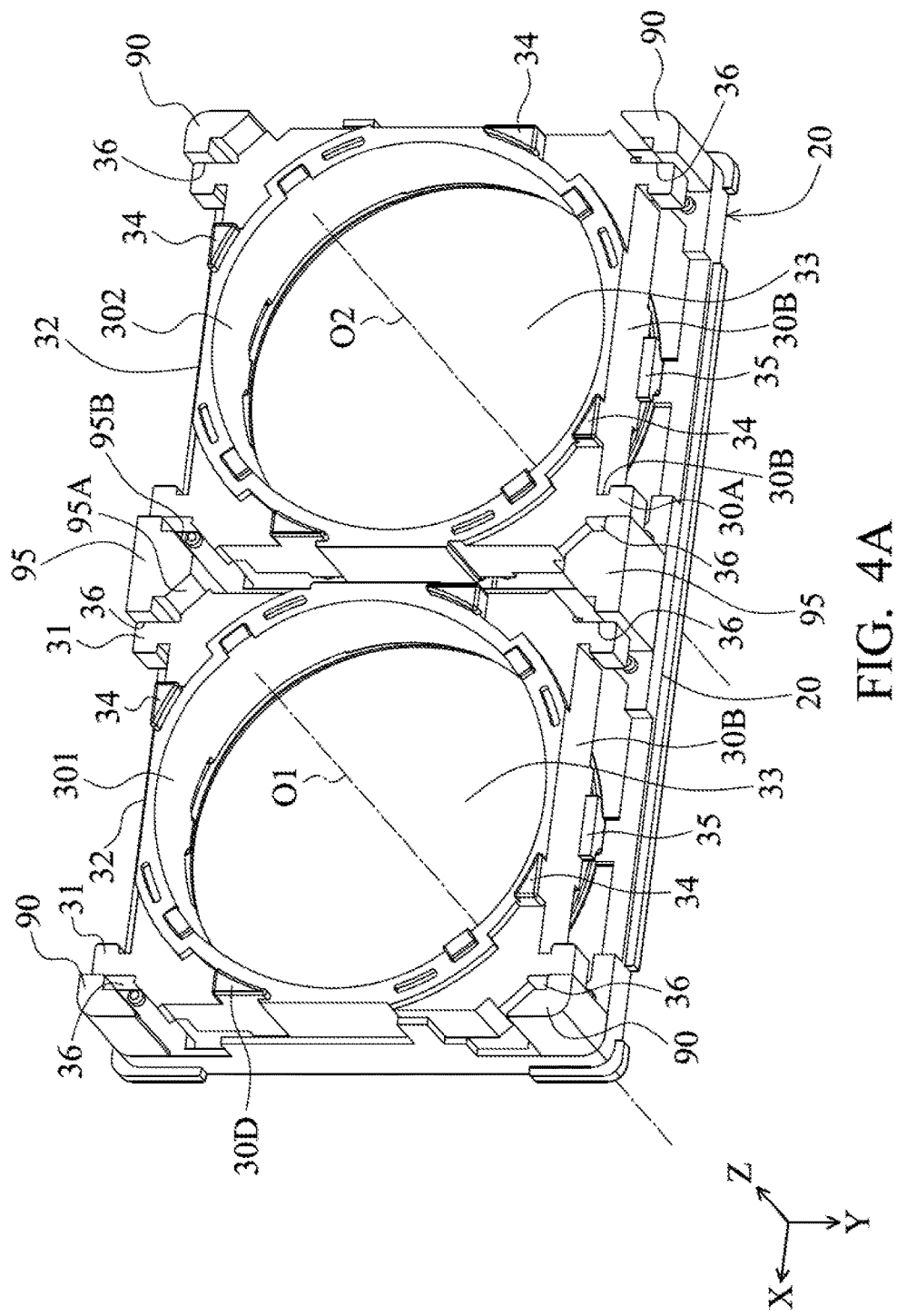
FIGS. 4A-4E are schematic views of some elements of the multiple lenses driving mechanism in accordance with some embodiments of the invention.
Figure 4B:
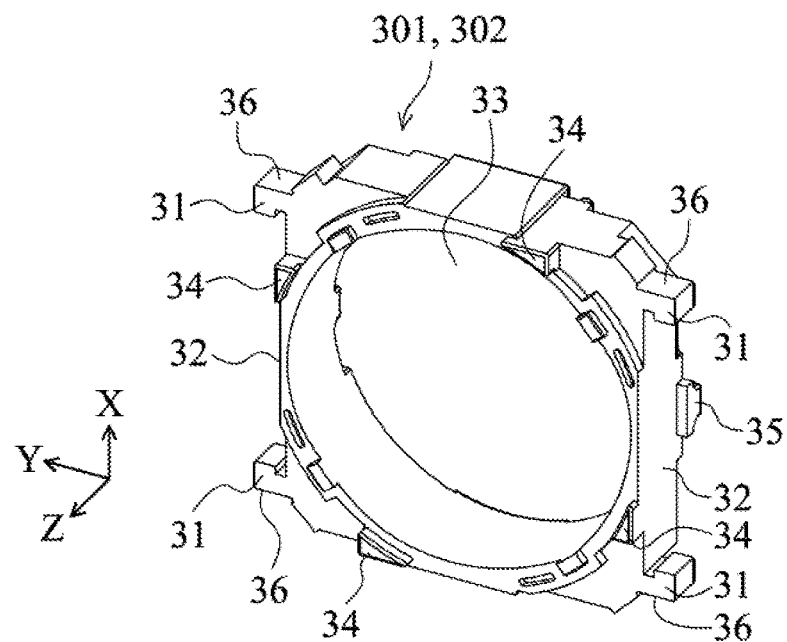
Figure 4C:
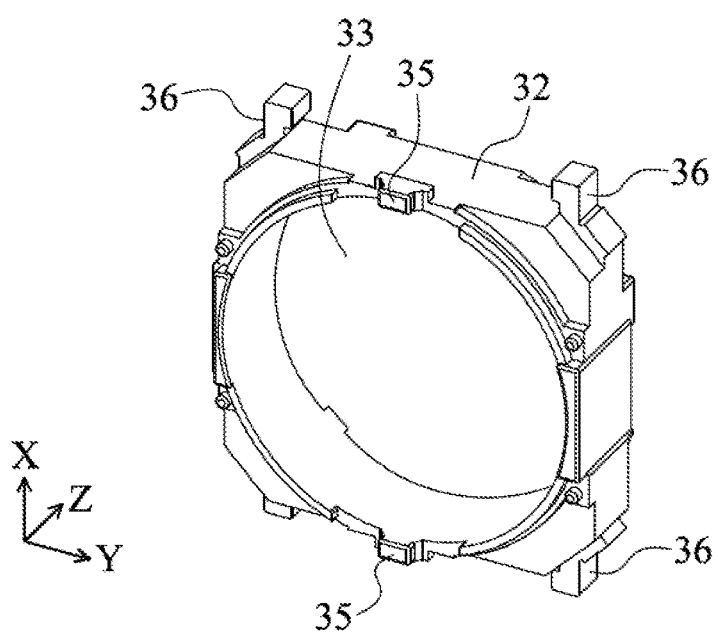
Figure 4D:
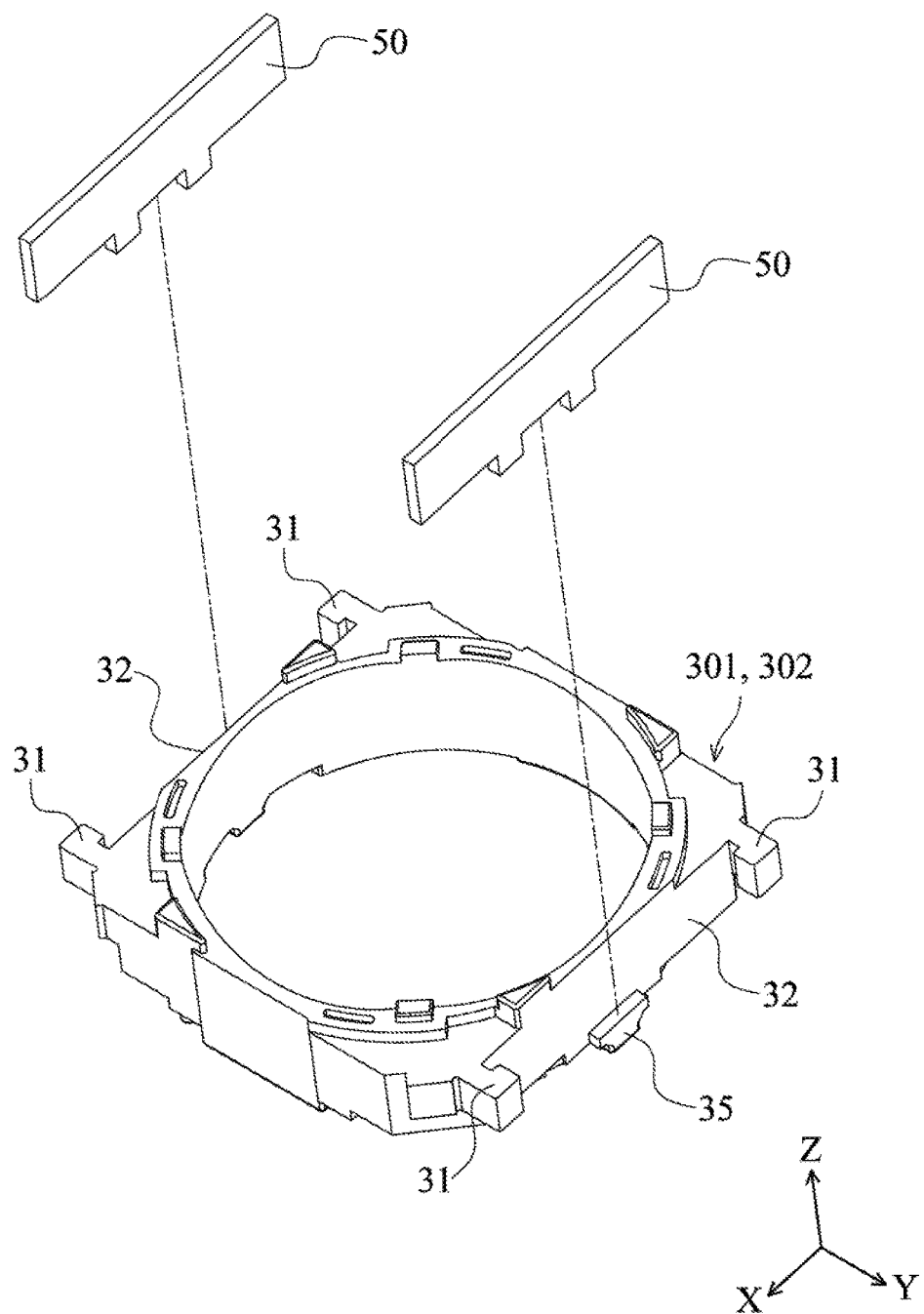
Figure 4E:
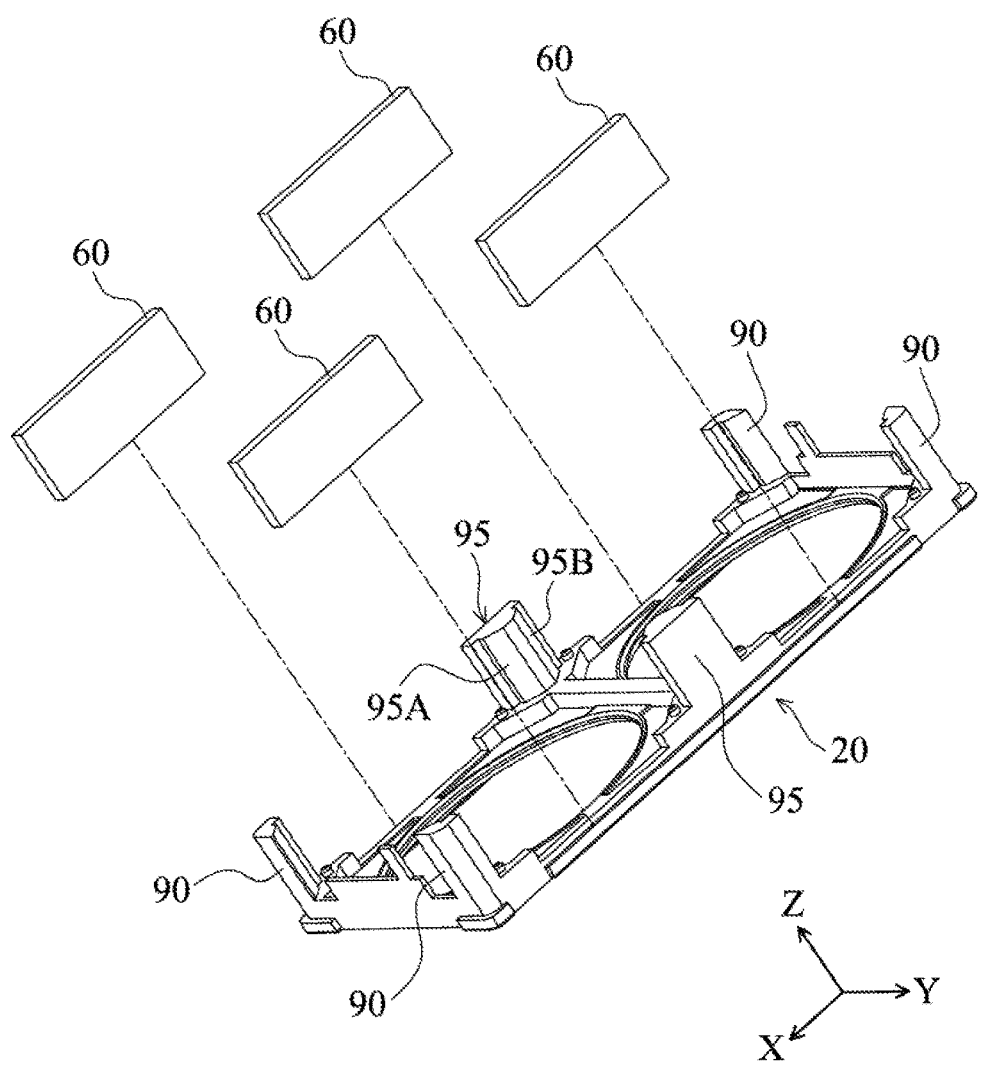

FIG. 4A is a schematic view of the relative position relationship of the first lens holder 301, the second lens holder 302 and the base 20 after assembly. FIGS. 4B and 4C are perspective views of the first lens holder 301 and the second lens holder 302 at different angles. FIG. 4D is an exploded view of the first lens holder 301, the second lens holders 302 and the coils 50. FIG. 4E is an exploded view of the base 20 and the driving magnets 60.

Please refer to FIGS. 4A-4E. As shown in FIG. 4A, the first lens holder 301 and the second lens holders 302 are disposed in the frame composed by the top casing 10 and the base 20, arranged along a longitudinal axis (X-axis), and may be used for respectively holding the first lens and the second lens (not shown).

As shown in FIGS. 4B and 4C, the first lens holder 301 and the second lens holder 302 respectively have same structures and form four restrict portions 31, two trenches 32, a through hole 33, four contact parts 34 and two stopping parts 35. In the first lens holder 301 and the second lens holder 302, two L-shaped restrict portions 31 are protruded from one side of the first lens holder 301 and one side of the second lens holder 302, and another two L-shaped restrict portions 31 are protruded from another side of the first lens holder 301 and another side of the second lens holder 302. The trenches 32 are formed between the two corresponding restrict portions 31 to accommodate the coil 50 (as shown in FIG. 4D). The first and second lenses may be secured in the through holes 33 of the first lens holder 301 and the second lens holder 302.

As shown in FIG. 4D, the coils 50 may be flat printed coils and substantially have a rectangle structure, which are disposed at the two opposite sides of the first and second lens holders 301, 302 and secured in the trench 32. When the coil 50 is inserted along the −Z axis direction into the trench 32, the stopping part 35 may contact the coil 50 and hold the coil 50 in a default position on the first lens holder 301 and the second lens holder 302, wherein the stopping part 35 is located between the two restrict portions 31 on the X-axis direction. Furthermore, as shown in FIG. 4E, each of the driving magnets 60 is secured on the base 20 and in a recess formed between a convex column 90 and a stopper 95, and adjacent to a corresponding coil 50 (not shown).

It should be noted that the pairs of driving magnets 60 and coils 50 correspond to the first lens holder 301 and the second lens holder 302 may be respectively referred to as the first lens driving assembly and the second lens driving assembly, and used for generating magnetic forces to force the first lens holder 301 and the second lens holder 302 respectively to move toward the first optical axis and the second optical axis with respect to the top casing 10 and the base 20, and thus achieve fast focusing. Furthermore, by using the design of the trench 32 and the stopping part 35 (as shown in FIG. 4D), it may be much more convenient to assemble the coils 50, and the positioning accuracy of the coil 50 on the first lens holder 301 and the second lens holder 302 may be improved as well. Moreover, because the coils 50 may be flat printed coils and only have to be disposed at the two sides of the lens, the width along the X-axis of the multiple lenses driving mechanism 100 may be reduced, and thus may further achieve mechanism miniaturization.

When the coils 50 and driving magnets 60 corresponding to the first lens holder 301 and the second lens holder 302 generate a magnetic force to drive the first lens holder 301 and the second lens holder 302 to respectively move toward the first optical axis O1 and the second optical axis O2, the contact parts 34 of the first lens holder 301 and the second lens holder 302 may contact the top casing 10 for restricting the movement of the first lens holder 301 and the second lens holder 302 along the Z axis. Although the movement of the first lens holder 301 and the second lens holder 302 along the Z axis is restricted by the protruding contact parts 34 in this embodiment, it is not limited thereto. For example, a bump (not shown) may also protrude from the inner surface of the top casing 10 toward the −Z axis direction to abut the first lens holder 301 or the second lens holder 302. As a result, the movement of the first lens holder 301 and the second lens holder 302 toward the directions of the first and second optical axes O1 and O2 may also be restricted within a fixed range.

It should be noted that the position of the stopper 95 is disposed between the first optical axis O1 and the second optical axis O2 along the longitudinal axis, and it is disposed on a longer side of a rectangle frame which is composed by the top casing 10 and the base 20. As shown in FIGS. 2, 4A and 4E, the stopper 95 includes a first restricting surface 95A and a second restricting surface 95B which are not parallel and respectively face the first lens holder 301 and the second lens holder 302. As shown in FIG. 4A, when the lens holders move on the XY plane with respect to the base 20, the first restricting surface 95A and the second restricting surface 95B may contact the first lens holder 301 and the second lens holder 302 to restrict the first lens holder 301 and the second lens holder 302 to a first restricted position and a second restricted position, respectively. Furthermore, a stopping face 36 of the restrict portion 31 also faces the stopper 95 to restrict the movement of the first lens holder 301 and the second lens holder 302. The design may prevent the two lens holders from contacting and colliding with each other during operation, which may damage the mechanism. Because no wall body with a large area needs to be disposed between the two lens holders to prevent collision of the two lens holders in this embodiment, the entire volume of the lenses holder may be minimized, which is beneficial to the miniaturization of the mechanism.

It should be noted that although only two stoppers 95 are shown in FIG. 4A to prevent the collision between the first lens holder 301 and the second lens holder 302, and thus increase the stability of the lenses holder 100 during operation, the embodiments of this invention are not limited thereto. Furthermore, the restrict portions 31 may contact the convex columns 90 through the stopping face 36 to restrict the first lens holder 301 or the second lens holder 302 from moving along the X axis with respect to the base 20 in a fixed range.

Figure 5:
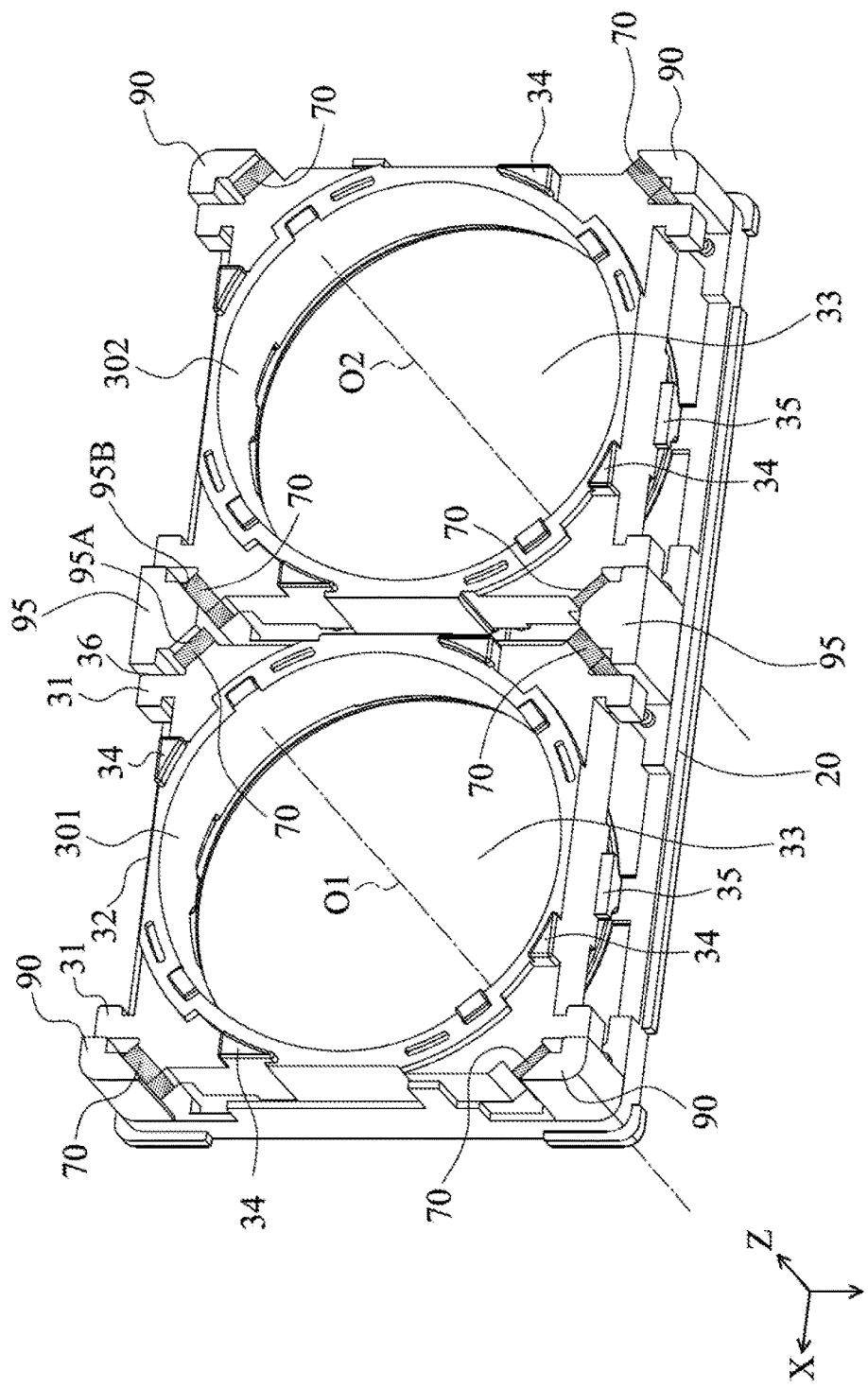
FIG. 5 is a schematic view of some elements of the multiple lenses driving mechanism in accordance with some embodiments of the invention.

Referring to FIG. 5, damping elements 70 may be disposed on the convex columns 90 in some embodiments. The damping elements 70 may be, for example, impact-absorbing materials, such as gel, and they may be used as a damping material. The damping elements 70 may prevent the restrict portions 31 and the convex columns 90 from severely colliding with each other. Moreover, the damping element 70 may help the first lens holder 301 and the second lens holder 302 to move quickly back to their original positions when facing impact, and it may also prevent resonance in the multiple lenses driving mechanism during operation, which may make the lenses unstable. As a result, the reaction time and the accuracy of the multiple lenses driving mechanism when focusing may be enhanced.

It should be noted that although the convex columns 90 and the base 20 are drawn separately in the above embodiments, in some embodiments the convex columns 90 may be formed integrally on the base 20 to enhance the structural strength of the multiple lenses driving mechanism 100.

Figure 6:
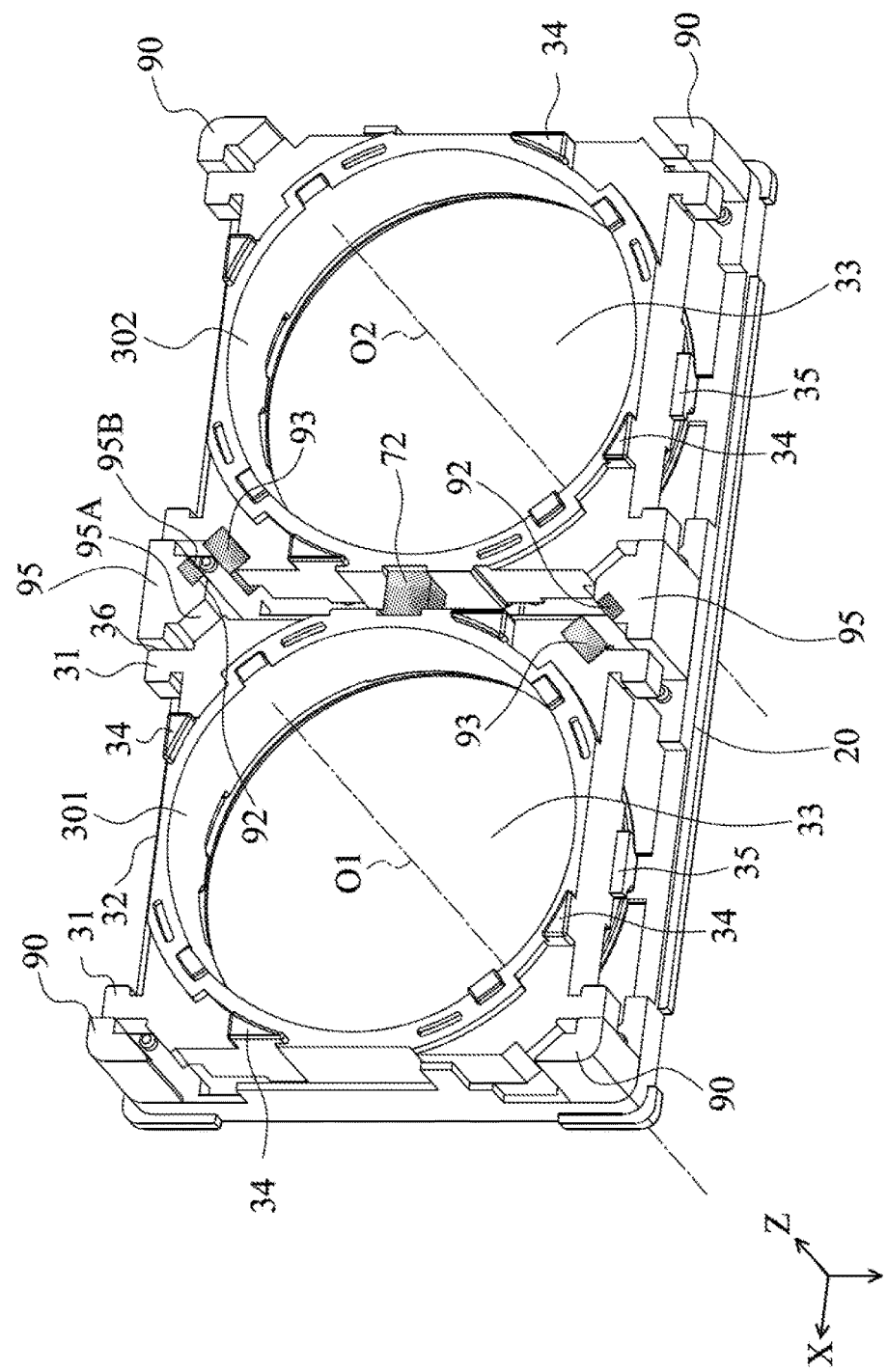
FIG. 6 is a schematic view of some elements of the multiple lenses driving mechanism in accordance with some embodiments of the invention.

In some embodiments, as shown in FIG. 6, a position sensing element 92 may be embedded on the first restricting surface 95A or the second restricting surface 95B of the stopper 95, and the position sensing element 92 corresponds to a magnetic element 93 on the first or second lens holders 301 or 302. The position sensing element 92 may be, for example, a Hall effect sensor, a MR sensor or a fluxgate, etc. The magnetic element 93 is disposed on the first lens holder 301 and the second lens holder 302, and corresponds to the position sensing element 92. When the first lens holder 301 and the second lens holder 302 moves with respect to the base 20 and the position sensing element 92, the position sensing element 92 may detect the location offset of the first lens holder 301 and the second lens holder 302 with respect to the base 20. (In this embodiment, the position sensing element 92 is used to detect the location offset of the first lens holder 301 and the second lens holder 302 when moving toward the direction of the first optical axis O1 and the second optical axis O2, and in another embodiment (not shown), the position sensing element 92 is used to detect the location offset of the first lens holder 301 and the second lens holder 302 when moving toward the direction of X axis and Y axis.) In this embodiment, the position sensing element 92 is disposed on the stopper 95, which may effectively utilize the inner space of the multiple lenses driving mechanism 100, so the dimensions of the mechanism may be minimized to achieve mechanism minimization.

Although the position sensing element 92 is disposed on the stopper 95, and the magnetic element 93 is disposed on the first lens holder 301 and the second lens holder 302, the configuration is not limited thereto. In some embodiments, depending on the design requirements, the locations of the position sensing element 92 and the magnetic element 93 may be exchanged. In other words, the position sensing element 92 may be disposed on the first and second lens holders 301 and 302, and the magnetic element 93 may be disposed on the stopper 95. This configuration may achieve the same effect as that in FIG. 6.

Furthermore, as shown in FIG. 6, a damping element 72 may be disposed between the first lens holder 301 and the second lens holder 302. As a result, unexpected resonance of the multiple lenses driving mechanism 100 during operation may be prevented to enhance the accuracy of the focusing of the multiple lenses driving mechanism 100, and the collision between the first lens holder 301 and the second lens holder 302, which may damage the mechanism, may also be prevented.

Figure 7:
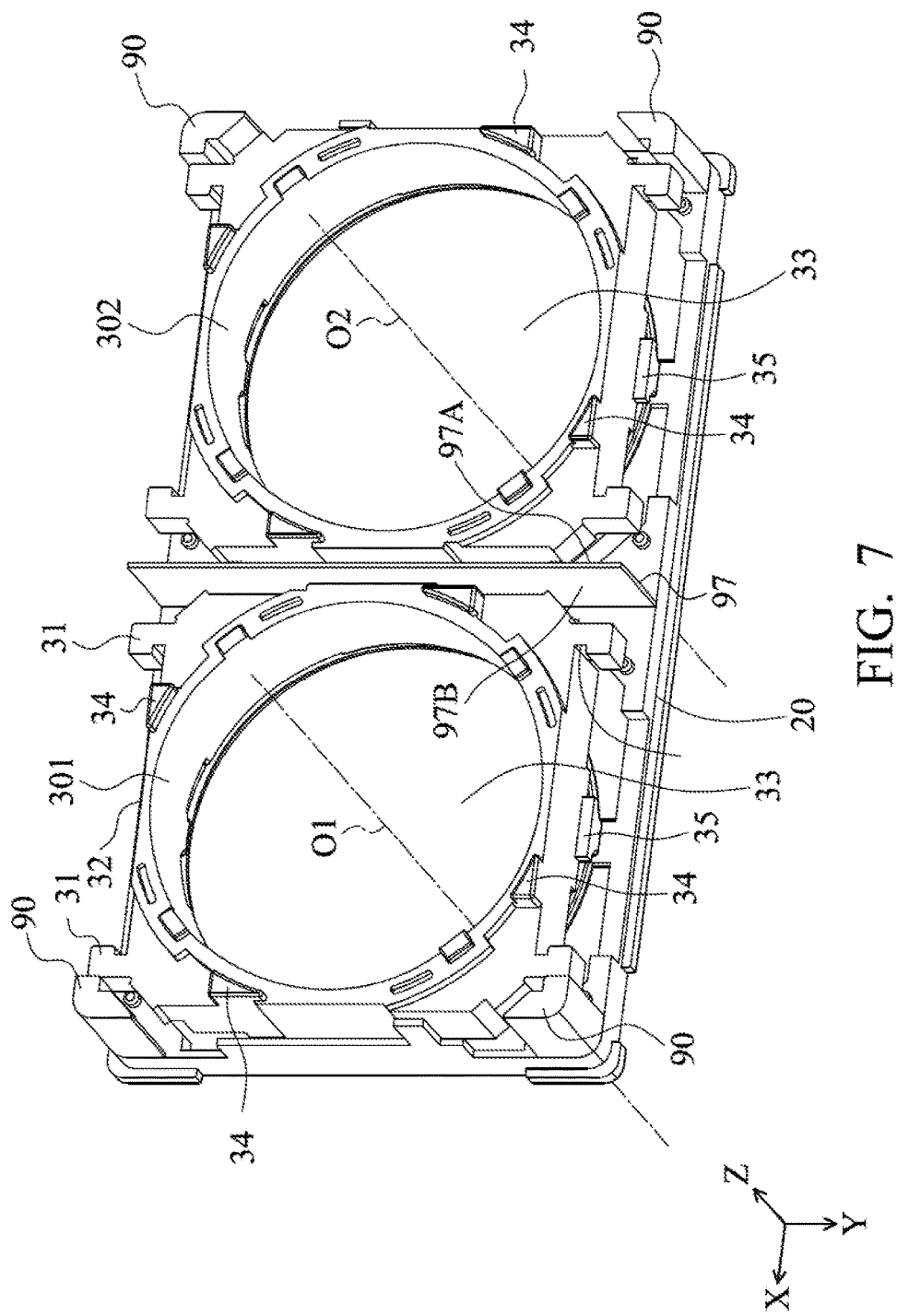
FIG. 7 is a schematic view of some elements of the multiple lenses driving mechanism in accordance with some embodiments of the invention.

In some embodiments, as shown in FIG. 7, a flat stopper 97 may be disposed between the first lens holder 301 and the second lens holder 302, which includes a first restricting surface 97A and a second restricting surface 97B which are parallel to respectively contact the first lens holder 301 and the second lens holder 302, and to restrict the first lens holder 301 and the second lens holder 302 to a first restricted position and a second restricted position, respectively. The damage caused from direct collision between the first lens holder 301 and the second lens holder 302 may be prevented by disposing the flat stopper 97.

Furthermore, in the multiple lenses driving mechanism 100, a magnetic shielding element (e.g. the stopper 97) may be disposed between the first lens holder 301 and the second lens holder 302 to prevent magnetic interference between the coils 50 and the corresponding driving magnets 60 on the two lens holders during operation, which may reduce the accuracy of the multiple lenses driving mechanism during focusing. It should be noted that in the embodiment of FIG. 7, the material of the flat stopper 97 may be a metal which is a nonmagnetic material, and can absorb or reflect magnetic waves. Therefore, magnetic interference between the coils 50 and the corresponding driving magnets 60 on the first lens holder 301 and the second lens holder 302 during operation may be reduced.

It should be noted that although the stopper 95 or 97 and the base 20 are illustrated separately in the previous embodiments, the stopper 95 or 97 and the base 20 may be integrally formed at one piece in some embodiments, and thus the mechanical strength of the multiple lenses driving mechanism 100 may be enhanced.

Figure 8A:
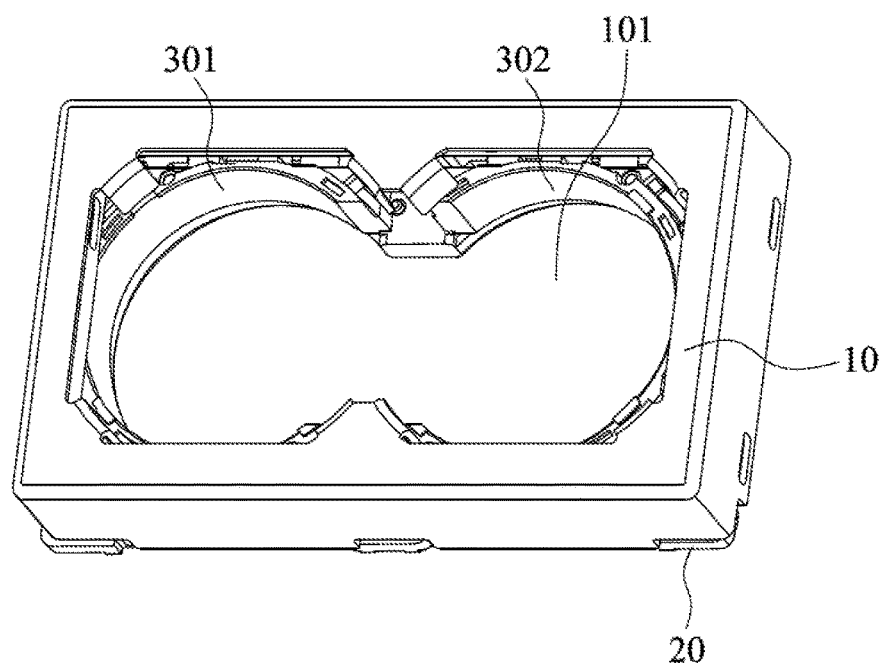
FIGS. 8A-8C are schematic views of some elements of the multiple lenses driving mechanism in accordance with some embodiments of the invention.
Figure 8B:
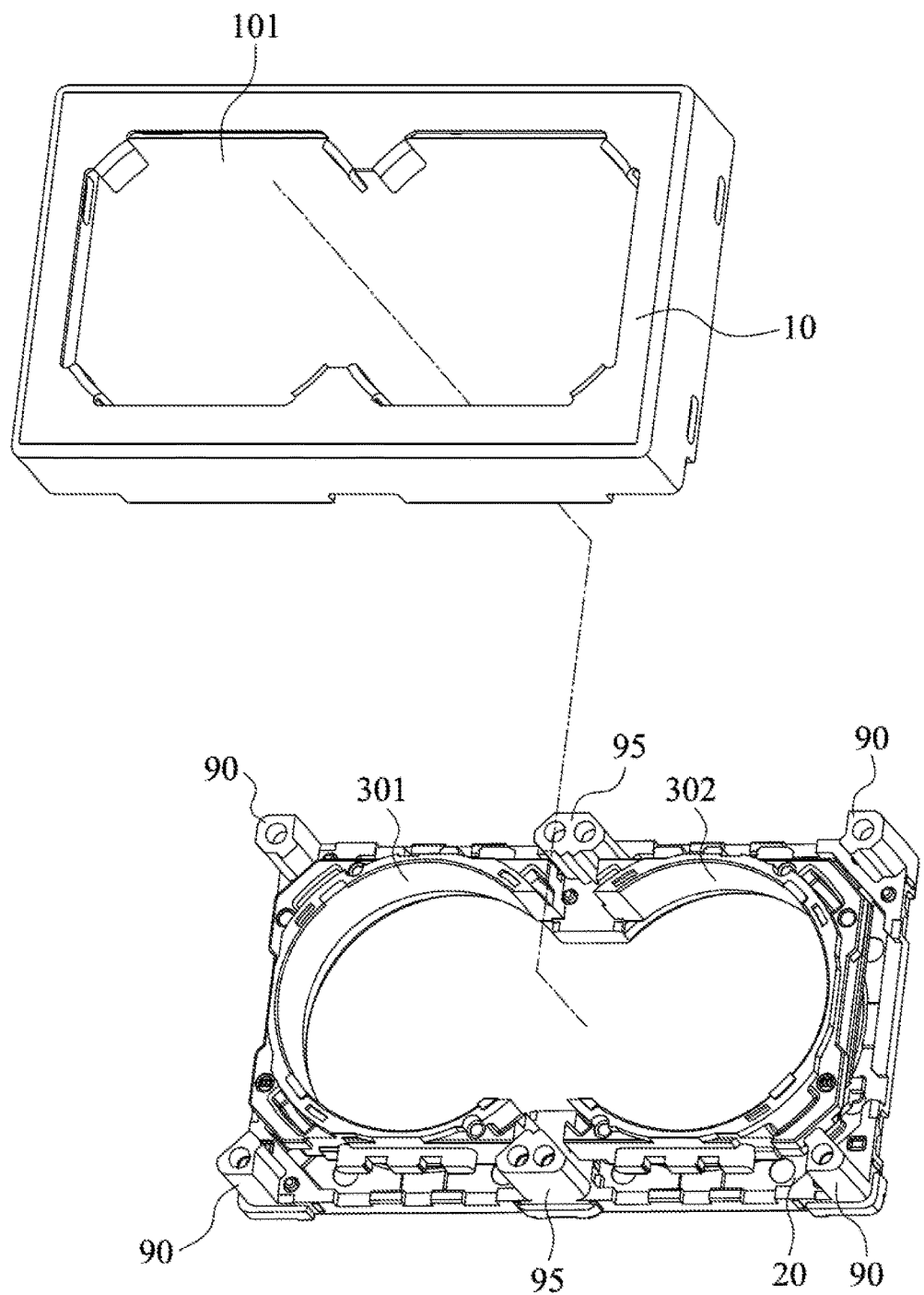
Figure 8C:
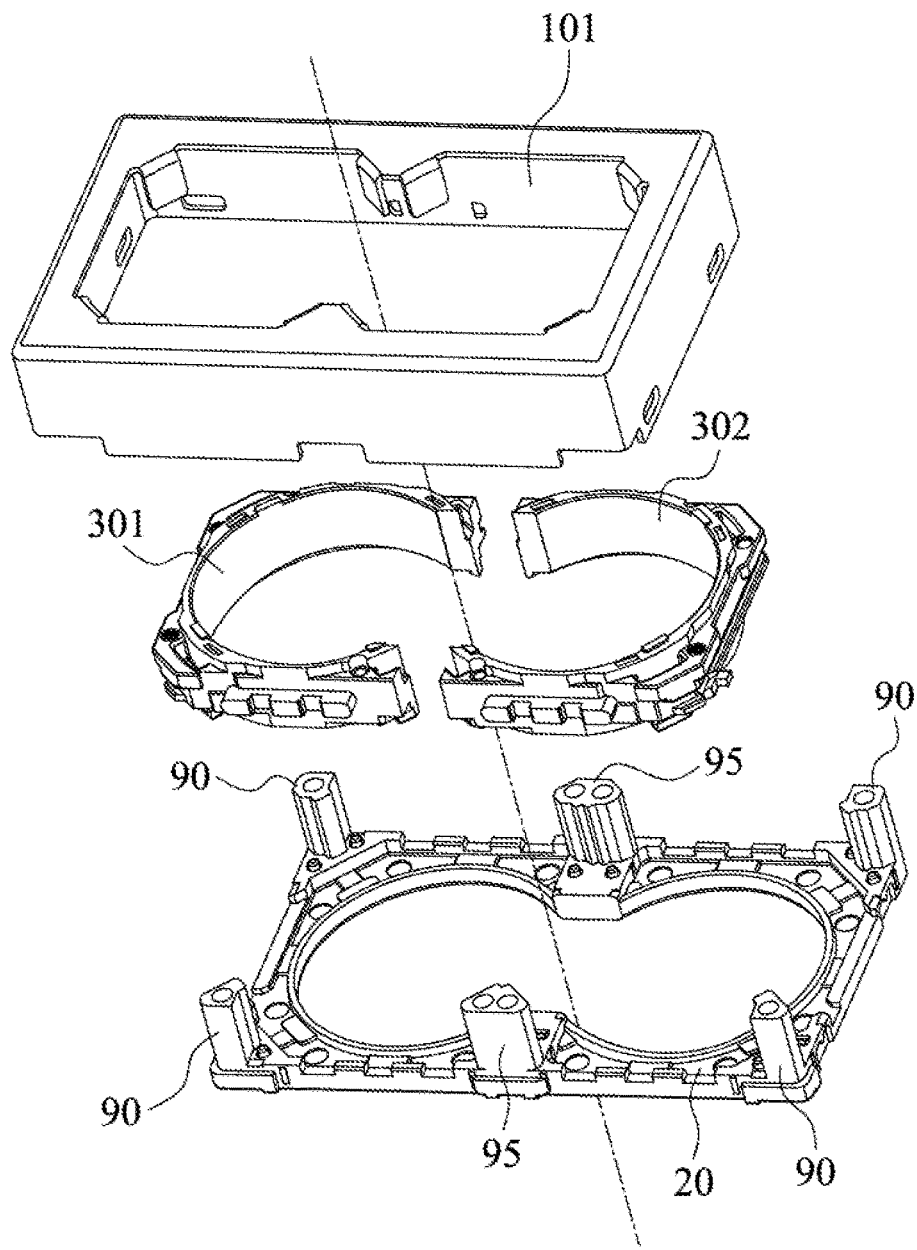

In some embodiments, in order to bring the first and second lenses closer to reduce parallax between the two lenses and thus enhance the photographic effectiveness, the first lens holder 301 and the second lens holder 302 may be configured to have a C-shape. As shown in FIGS. 8A-8C, which are illustrations of the top casing 10, the base 20, the first lens holder 301, the second lens holder 302, the convex columns 90, and the stopper 95 of the multiple lenses driving mechanism 100 according to some embodiments, wherein the top casing 10 only has an opening 101 which corresponds to the first and second lens holders 301 and 302. Furthermore, the openings of the C-shaped first and second lens holders 301 and 302 are facing each other to bring the first and second lenses closer, thereby enhancing the photographic effectiveness. In this embodiment, the coils and the driving magnets (not shown) are disposed on the sides of the first and second lens holders 301 and 302 which are not opening sides. With this configuration, the dimensions of the multiple lenses driving mechanism 100 may be minimized, and thus achieve mechanism minimization and enhance the quality of the photography.

In summary, a multiple lenses driving mechanism is provided in the present invention, including a frame (which includes a top casing and a base), a first lens holder, a second lens holder, a first lens driving assembly, a second lens assembly, and a stopper. The stopper is disposed on one side of the frame and between the two lens holders, which may restrict the first lens holder in a first restricted position and restrict the second lens holder in a second restricted position, respectively. As a result, the dimensions of the multiple lenses driving mechanism may be minimized, and collision between the lenses of the lens holders during operation, which can cause damage, may be prevented.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A multiple lenses driving mechanism, comprising:
a frame;
a first lens holder and a second lens holder disposed in the frame and arranged along a longitudinal axis for respectively holding a first lens and a second lens, wherein the first lens and the second lens respectively define a first optical axis and a second optical axis;
a first lens driving assembly and a second lens driving assembly disposed in the frame to respectively drive the first lens holder and the second lens holder; and
a stopper disposed between the first and second lens holders that has a first restricting surface and a second restricting surface, wherein the first restricting surface and the second restricting surface respectively face the first lens holder and the second lens holder, so as to restrict the first and second lens holders in a first restricted position and a second restricted position, the first restricting surface and the second restricting surface are parallel to each other, and the material of the stopper includes metal.

2. The multiple lenses driving mechanism system as claimed in claim 1, wherein the material of the stopper includes nonmagnetic material.

3. The multiple lenses driving mechanism system as claimed in claim 1, wherein the first restricting surface and the second restricting surface are not parallel to each other.

4. The multiple lenses driving mechanism system as claimed in claim 1, wherein the stopper is disposed at a side of the frame.

5. The multiple lenses driving mechanism system as claimed in claim 1, wherein the first lens holder comprises a restrict portion, and the restrict portion comprises a stopping face that faces the stopper.

6. The multiple lenses driving mechanism system as claimed in claim 1, further comprising a base, wherein the stopper and the base are integrally formed at one piece.

7. The multiple lenses driving mechanism system as claimed in claim 1, further comprising a damping element disposed between the stopper and the first lens holder.

8. The multiple lenses driving mechanism system as claimed in claim 1, further comprising a damping element disposed between the first lens holder and the second lens holder.

9. The multiple lenses driving mechanism system as claimed in claim 1, further comprising a position sensing element disposed on the stopper.

10. The multiple lenses driving mechanism system as claimed in claim 1, wherein the first restricting surface and the second restricting surface is between the first optical axis and the second optical axis along the longitudinal axis.

11. The multiple lenses driving mechanism system as claimed in claim 1, further comprising a plurality of stoppers disposed between the first lens holder and the second lens holder.

12. The multiple lenses driving mechanism system as claimed in claim 1, wherein the stopper and the frame are integrally formed at one piece.

13. The multiple lenses driving mechanism system as claimed in claim 1, wherein the first lens holder has a C-shaped structure.

14. A multiple lenses driving mechanism, comprising:
a frame;
a first lens holder and a second lens holder disposed in the frame and arranged along a longitudinal axis for respectively holding a first lens and a second lens, wherein the first lens and the second lens respectively define a first optical axis and a second optical axis;
a first lens driving assembly and a second lens driving assembly disposed in the frame to respectively drive the first lens holder and the second lens holder;

a stopper disposed between the first and second lens holders that has a first restricting surface and a second restricting surface; and a damping element disposed between the stopper and the first lens holder, wherein the first restricting surface and the second restricting surface respectively face the first lens holder and the second lens holder, so as to restrict the first and second lens holders in a first restricted position and a second restricted position.

15. The multiple lenses driving mechanism system as claimed in claim 14, wherein the first restricting surface and the second restricting surface are parallel to each other.

16. The multiple lenses driving mechanism system as claimed in claim 14, wherein the first restricting surface and the second restricting surface are not parallel to each other.

17. The multiple lenses driving mechanism system as claimed in claim 14, wherein the first lens holder comprises a restrict portion, and the restrict portion comprises a stopping face that faces the stopper.

18. The multiple lenses driving mechanism system as claimed in claim 14, further comprising a damping element disposed between the first lens holder and the second lens holder.

19. The multiple lenses driving mechanism system as claimed in claim 14, wherein the first restricting surface and the second restricting surface is between the first optical axis and the second optical axis along the longitudinal axis.

20. The multiple lenses driving mechanism system as claimed in claim 14, further comprising a plurality of stoppers disposed between the first lens holder and the second lens holder.

* * * * *